(12) United States Patent
Franceschi et al.

(10) Patent No.: US 9,228,618 B2
(45) Date of Patent: Jan. 5, 2016

(54) TORQUE LIMITER

(71) Applicant: COMPOMAC S.p.A., Castel Maggiore (IT)

(72) Inventors: Claudio Franceschi, Bologna (IT); Alessandro Marella, Bologna (IT)

(73) Assignee: Compomac S.p.A., Castel Maggiore (IT)

( * ) Notice: Subject to any disclaimer, the term of this patent is extended or adjusted under 35 U.S.C. 154(b) by 0 days.

(21) Appl. No.: 14/501,243

(22) Filed: Sep. 30, 2014

(65) Prior Publication Data

US 2015/0094155 A1    Apr. 2, 2015

(30) Foreign Application Priority Data

Sep. 30, 2013 (IT) .............................. BO2013A0539

(51) Int. Cl.
*F16D 7/00* (2006.01)
*F16D 7/08* (2006.01)
*F16D 43/206* (2006.01)

(52) U.S. Cl.
CPC *F16D 7/005* (2013.01); *F16D 7/08* (2013.01); *F16D 43/206* (2013.01)

(58) Field of Classification Search
CPC ........... F16D 7/005; F16D 7/007; F16D 7/08; F16D 7/10; F16D 43/204; F16D 43/206; F16D 43/208
USPC .......................................................... 464/36
See application file for complete search history.

(56) References Cited

U.S. PATENT DOCUMENTS

| 2,875,601 | A | * | 3/1959 | Georges | 464/25 |
| 3,985,213 | A | * | 10/1976 | Braggins | 192/56.57 |
| 8,162,246 | B2 | | 4/2012 | Long | |
| 2010/0210386 | A1 | * | 8/2010 | Long, Jr. | 474/148 |
| 2011/0088818 | A1 | * | 4/2011 | Long, Jr. | 148/540 |

FOREIGN PATENT DOCUMENTS

| DE | 10 2008 008412 | | 8/2009 |
| EP | 0 478 517 | * | 4/1992 |
| EP | 1 605 178 | | 12/2005 |
| WO | 2013/127007 | | 9/2013 |

OTHER PUBLICATIONS

Italian Search Report issued for corresponding application IT BO2013A 0539 filed Sep. 30, 2013.

* cited by examiner

*Primary Examiner* — Josh Skroupa
(74) *Attorney, Agent, or Firm* — Gottlieb, Rackman & Reisman, P.C.

(57) ABSTRACT

A torque limiter for transmitting motion from a drive shaft to a driven member, and for selectively disconnecting the driven member from the drive shaft when a predetermined transmitted twisting torque value is exceeded. The torque limiter has a hub fitted to the drive shaft; a rotary first flange fixed to an axial end of the hub; a second flange fixed to the driven member; and a number of modules fitted to the first flange. The first flange is fixed to the hub. The modules are equally spaced along the annular portion of the first flange, and one appendage is located between each two adjacent modules.

3 Claims, 2 Drawing Sheets

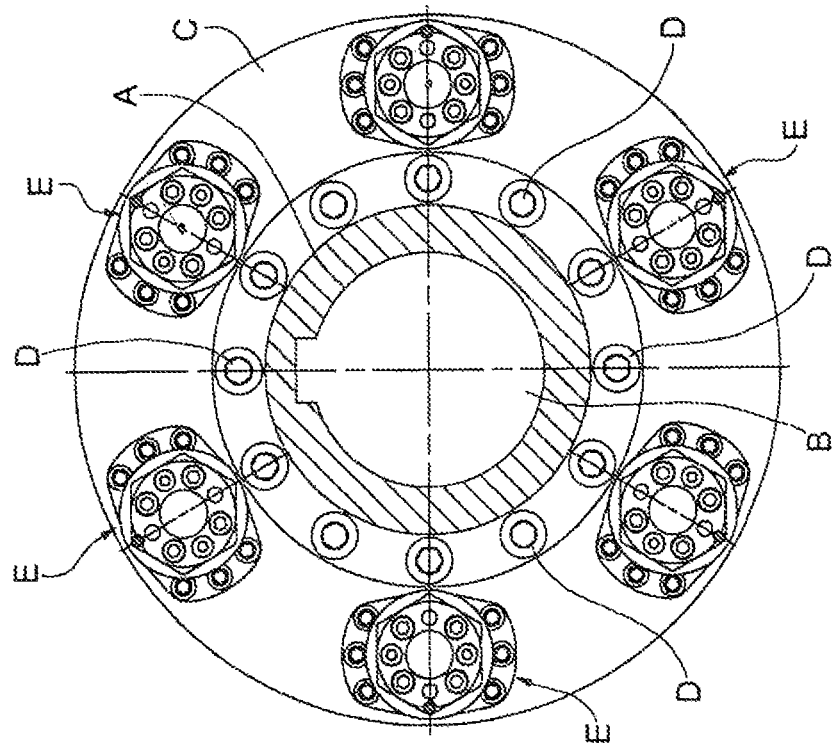
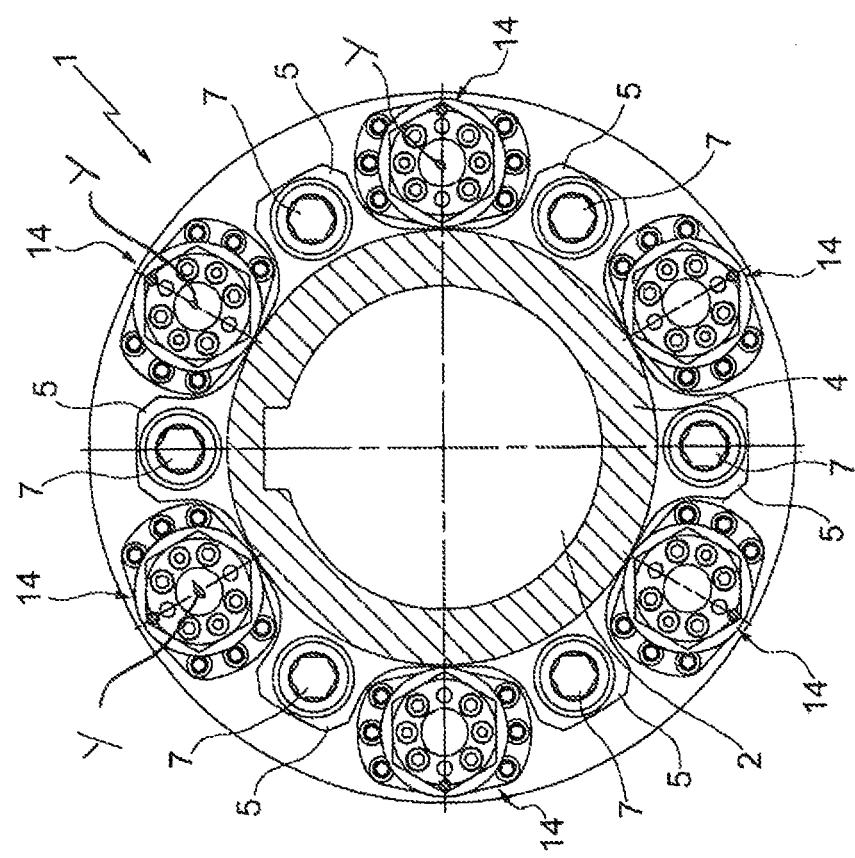
FIG.2
FIG.3 (PRIOR ART)

TORQUE LIMITER

The present invention relates to a torque limiter.

BACKGROUND OF THE INVENTION

A torque limiter is installed between a rotary drive member and a rotary driven member, acts as a joint and, in addition to transmitting twisting torque, determines a maximum twisting torque transmittable by the rotary drive member to the rotary driven member, so as to disconnect the two members when the maximum twisting torque is exceeded.

As shown in FIG. 3, currently used torque limiters comprise
a hub A fitted to a rotary drive shaft B;
a first flange C fixed to the hub by a number of screws D;
a second flange (not shown) fitted to a rotary driven shaft (not shown); and
a number of modules E for transmitting motion between the two flanges, and for disconnecting the flanges when a maximum transmitted twisting torque is exceeded.

At present, screws D fastening the first flange C to hub A are located along an annular portion smaller in diameter than that along which modules E are located. So, to connect the rotary driven member to a rotary drive member with a rotary shaft of a different, e.g. larger, diameter, the entire torque limiter, including the second flange fitted to the rotary driven shaft, must be changed. And, since torque limiters of this type are used in very large structures, changing the torque limiter means moving one of the two structures, with all the problems the size of the structures poses.

SUMMARY OF THE INVENTION

It is an object of the present invention to provide a torque limiter designed to eliminate the above drawback, i.e. which, to employ a rotary drive shaft differing in diameter from the one currently being used, simply involves changing the hub fitted to the rotary drive shaft.

According to the present invention, there is provided a torque limiter for transmitting motion between a rotary drive shaft and a driven member, and for disconnecting said driven member from said drive shaft when a predetermined transmitted twisting torque value is exceeded; the torque limiter comprising:
a hub fitted to said drive shaft;
a rotary first flange fixed to an axial end of said hub facing said driven member;
a second flange fixed to said driven member and facing said first flange; and
a number of modules fitted to an annular portion of said first flange, and for transmitting motion from said first flange to said second flange, and for cutting off said transmission when the transmitted torque exceeds a predetermined maximum value;
said first flange being fixed to said hub at said annular portion to which said modules are fitted;
said hub having a number of appendages projecting radially outwards and each fixed to said first flange by at least one bolt;
the torque limiter being characterized in that said modules are equally spaced along said annular portion of said first flange, and in that one said appendage is located between each two adjacent said modules.

BRIEF DESCRIPTION OF THE DRAWINGS

A non-limiting embodiment of the invention will be described, purely by way of example, with reference to the attached drawings, in which:

FIG. 2 shows a partial view along line II-II of the FIG. 1 torque limiter;
FIG. 3 shows a partial view of a currently marketed torque limiter.

DETAILED DESCRIPTION OF THE INVENTION

Figure 1:
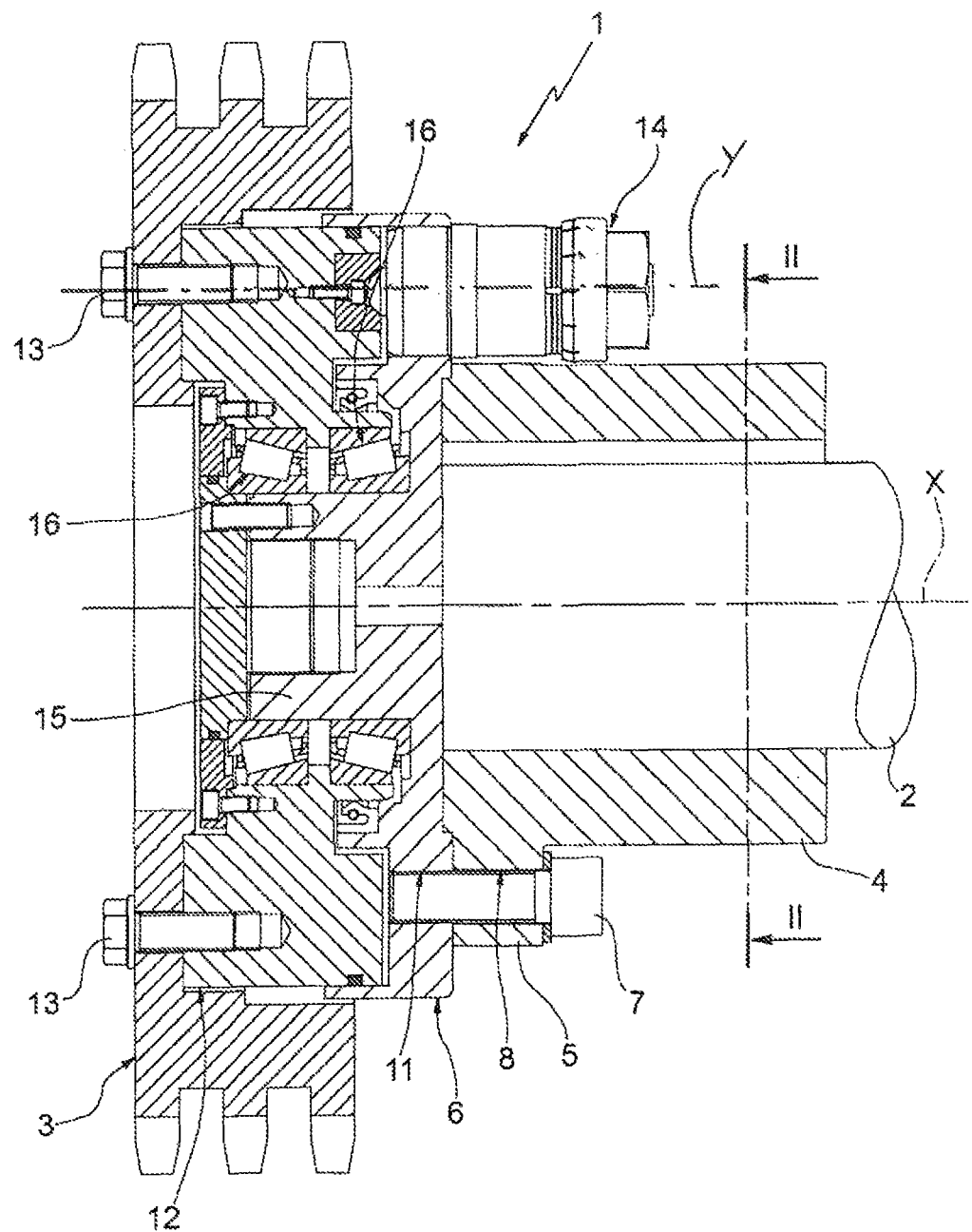
FIG. 1 shows a section of a torque limiter in accordance with the teachings of the present invention.

Number 1 in FIG. 1 indicates as a whole a torque limiter for transmitting a twisting torque between a drive shaft 2 rotating about an axis X, and a rotary driven member 3 coaxial with axis X.

Torque limiter 1 comprises a hub 4 fitted to drive shaft 2 and having, at its axial end facing driven member 3, a number of appendages 5 projecting radially outwards. Torque limiter 1 also comprises a rotary annular flange 6 (of axis X) located at the axial end of hub 4 and fixed to the hub by bolts 7. More specifically, each appendage 5 has a through hole 8 facing a respective threaded hole 11 formed in flange 6. The threaded stem of bolt 7 fits through hole 8 and screws into hole 11.

Torque limiter 1 also comprises a rotary annular flange 12 (of axis X) facing flange 6 and fixed to driven member 3 by a number of bolts 13. An annular portion of flange 6 supports a number of equally spaced modules 14 each having a symmetrical axis Y as seen in FIG. 1 ( such modules 14 are well known in the art and therefore not described herein in detail) for transmitting motion from flange 6 to flange 12 and therefore from drive shaft 2 to driven member 3. Modules 14 cut off said transmission when the transmitted torque exceeds a maximum value defined, by a preloaded spring (not shown) fitted inside each module 14. More specifically, each module 14 has a ball housed partly inside flange 6 and partly inside flange 12; and a pin which, by virtue of said spring, keeps the ball seated as described above, to transmit motion between flanges 6 and 12. From the centre of the face of flange 6 facing flange 12, a cylindrical projection 15 (of axis X) extends inside flange 12. And two annular bearings 16 are fitted between the outer portion of projection 15 and the inner face of flange 12.

With reference to FIG. 2, the main characteristic of the present invention lies in flange 6 being fixed to hub 4 along the same annular portion supporting modules 14. More specifically, appendages 5 are each located between two adjacent modules 14. The embodiment shown comprises one bolt 7 for each appendage 5. A different embodiment may even comprise two bolts 7 for each appendage 5; in which case, each appendage 5 would have two through holes 8, and flange 12 two threaded holes 11 for each appendage 5.

The many advantages of the present invention will be clear by simply comparing FIGS. 2 and 3. More specifically, shifting the flange 6 to hub 4 fastening area outwards provides additional space enabling torque limiter 1 to be used with drive shafts 2 of different, in particular larger, diameters than the one shown. And this by simply changing hub 4 fitted to drive shaft 2, without affecting any of the other component parts of torque limiter 1. So, in addition to greatly reducing cost in terms of torque limiter component parts to employ drive shafts of different diameters, the hub can be changed quickly, and therefore more cheaply, by also reducing downtime.

The invention claimed is:
1. A torque limiter for transmitting motion between a rotary drive shaft (2), rotating about a rotation axis (X), and a driven member (3), and for disconnecting said driven member (3)

from said drive shaft (2) when a predetermined transmitted twisting torque value is exceeded; the torque limiter comprising:
- a hub (4) configured to be fitted to the drive shaft (2);
- a rotary first flange (6) fixed to an axial end of said hub (4) configured to face the driven member (3);
- a second flange (12) configured to be fixed to the driven member (3) and facing said first flange (6); and
- a number of modules (14) fitted to an annular portion of said first flange (6), and for transmitting motion from said first flange (6) to said second flange (12), and for cutting off said transmission when the transmitted torque exceeds a predetermined maximum value;
- said first flange (6) being fixed to said hub (4) at said annular portion to which said modules (14) are fitted;
- said hub (4) having a number of appendages (5) projecting radially outwards and each fixed to said first flange (6) by at least one bolt (7);
- wherein each of said number of modules (14) has a symmetry axis (Y) parallel to the rotation axis (X), in that said modules are equally spaced along said annular portion of said first flange (6), and in that said appendages (5) are each located between two adjacent said modules (14), such that said at least one bolt (7) is placed between two adjacent modules (14).

2. A torque limiter for transmitting motion between a rotary drive shaft (2), rotating about a rotation axis (X), and a driven member (3), and for disconnecting said driven member (3) from said drive shaft (2) when a predetermined transmitted twisting torque value is exceeded; the torque limiter comprising:
- a hub (4) configured to be fitted to the drive shaft (2);
- a rotary first flange (6) fixed to an axial end of said hub (4) configured to face the driven member (3);
- a second flange (12) configured to be fixed to the driven member (3) and facing said first flange (6); and
- a number of modules (14) fitted to an annular portion of said first flange (6), and for transmitting motion from said first flange (6) to said second flange (12), and for cutting off said transmission when the transmitted torque exceeds a predetermined maximum value;
- said first flange (6) being fixed to said hub (4) at said annular portion to which said modules (14) are fitted;
- said hub (4) having a number of appendages (5) projecting radially outwards and each fixed to said first flange (6) by at least one bolt (7);
- wherein each of said number of modules (14) is oriented with a symmetry axis (Y) of each module being disposed parallel to the rotation axis (X) and in that each appendage (5) has a through hole (8) facing a respective threaded hole (11) formed in said first flange (6) such that a threaded stem of said at least one bolt (7) fits said through hole (8) and screws into said threaded hole (11).

3. The torque limiter of claim 2 wherein each of said appendages (5) and bolts (7) are radially offset along the axis X with respect to said modules (14).

* * * * *